United States Patent
Sasso et al.

(10) Patent No.: US 11,939,518 B2
(45) Date of Patent: Mar. 26, 2024

(54) WELLBORE TREATMENT FLUID

(71) Applicant: Halliburton Energy Services, Inc., Houston, TX (US)

(72) Inventors: Alejandro de la Cruz Sasso, Al-Khobar (SA); Hassan Ali Ghadban, Dhahran (SA); Paul J. Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/682,964

(22) Filed: Feb. 28, 2022

(65) Prior Publication Data

US 2023/0272260 A1 Aug. 31, 2023

(51) Int. Cl.
*C09K 8/08* (2006.01)
*C09K 8/40* (2006.01)

(52) U.S. Cl.
CPC . *C09K 8/40* (2013.01); *C09K 8/08* (2013.01)

(58) Field of Classification Search
CPC .................................. C09K 8/40; C09K 8/08
See application file for complete search history.

(56) References Cited

U.S. PATENT DOCUMENTS

| 4,083,407 A * | 4/1978 | Griffin, Jr. | C09K 8/40 507/216 |
| 11,168,242 B2 | 11/2021 | Jones et al. | |
| 2004/0182577 A1 * | 9/2004 | Chatterji | C09K 8/04 166/305.1 |
| 2008/0265763 A1 | 10/2008 | Furugori et al. | |
| 2009/0048247 A1 | 2/2009 | Palle et al. | |
| 2011/0172130 A1 * | 7/2011 | Sarap | C09K 8/501 507/269 |
| 2014/0158354 A1 | 6/2014 | Kumar et al. | |
| 2015/0129217 A1 | 5/2015 | Vorderbruggen et al. | |
| 2018/0265763 A1 * | 9/2018 | Leotaud | C09K 8/40 |
| 2019/0292431 A1 * | 9/2019 | AlBahrani | C04B 7/527 |
| 2021/0047555 A1 * | 2/2021 | Jones | C09K 8/46 |

FOREIGN PATENT DOCUMENTS

| EP | 814232 A2 * | 12/1997 | ............... C09K 8/40 |
| EP | 0814232 B1 | 12/2003 | |
| WO | 2017074301 | 5/2017 | |

OTHER PUBLICATIONS

International Search Report and Written Opinion for International Patent Application No. PCT/US2022/045639 dated Jan. 27, 2023.

* cited by examiner

*Primary Examiner* — Kumar R Bhushan
(74) *Attorney, Agent, or Firm* — Thomas Rooney; C. Tumey Law Group PLLC

(57) ABSTRACT

Provided are methods and systems related to spacer fluids that include a spacer additive comprising a biopolymer polysaccharide gum, a modified cellulose, and a solid scouring material while being essentially free of clay and crystalline silica. These spacer fluids have improved compatibility with displaced fluids, such as oil-based drilling fluids. In addition, the combination of the biopolymer polysaccharide gum and modified cellulose imparts unique rheological characteristics to the spacer fluid as compared to the use of either of these materials alone.

20 Claims, 2 Drawing Sheets

WELLBORE TREATMENT FLUID

BACKGROUND

Spacer fluids are often used in subterranean operations to facilitate improved displacement efficiency when introducing new fluids into a well bore. For example, a spacer fluid can be used to displace a fluid in a well bore before introduction of another fluid. When used for drilling fluid displacement, spacer fluids can enhance solids removal as well as separate the drilling fluid from a physically incompatible fluid. For instance, in primary cementing operations, the spacer fluid may be placed into the well bore to separate the cement composition from the drilling fluid. Spacer fluids may also be placed between different drilling fluids during drilling change-outs or between a drilling fluid and completion brine. Spacer fluids typically do not consolidate in that the spacer fluids typically do not develop significant gel or compressive strength.

The spacer fluid can have certain characteristics to improve its effectiveness. For example, the spacer fluid may be compatible with the displaced fluid and the cement composition. This compatibility may also be present at downhole temperatures and pressures. In some instances, spacer fluids may be used to displace oil-based drilling fluids, often referred to as "oil-based muds," from a wellbore. Oil-based drilling fluids are typically an invert emulsion that includes an aqueous internal phase and an oil external phase. However, certain spacer fluids may exhibit negative interactions when contact and mixing occurs in the wellbore with the oil-based drilling fluids. This negative interaction may be referred to as "incompatibility" and may be observed as a significant increase in viscosity greater than either the viscosity of the spacer fluid or the oil-based drilling fluid.

BRIEF DESCRIPTION OF THE DRAWINGS

These drawings illustrate certain aspects of some of the embodiments of the present disclosure and should not be used to limit or define the present disclosure.

DETAILED DESCRIPTION

Figure 1:
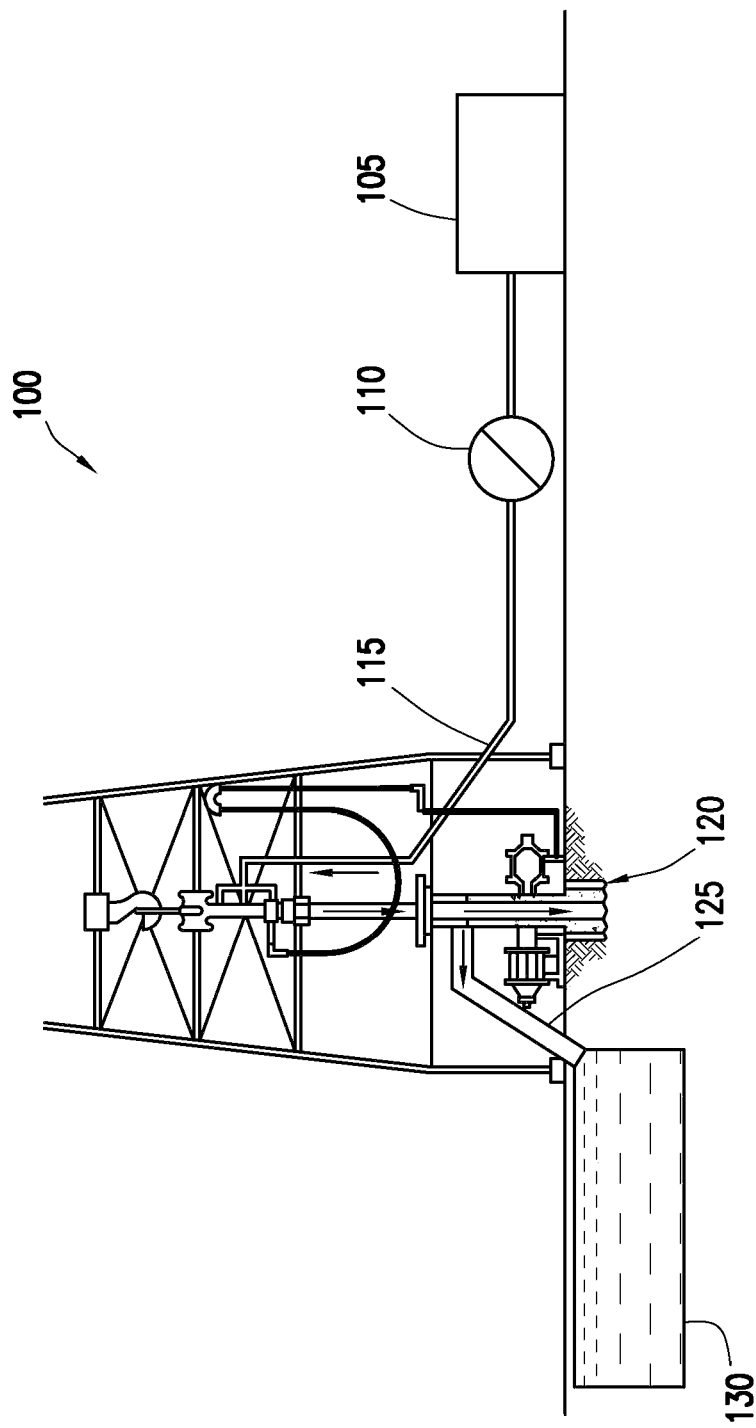
FIG. 1 is a schematic illustration of an example system for the preparation and delivery of a spacer fluid to a wellbore.

The present disclosure relates to spacer fluids for use in subterranean operations and, more particularly, in certain embodiments, to spacer fluids that include a spacer additive comprising a biopolymer polysaccharide gum, a modified cellulose, and a solid scouring material while being essentially free of clay and crystalline silica. As used herein, the term "essentially free" refers to the compositions being free of the material or, to the extent the material is present, the material is present in an amount of about 5% by weight or less, for example less than 5% by weight, less than 1% by weight, or less than 0.1% by weight.

Advantageously, by using the biopolymer polysaccharide gum and modified cellulose for viscosity instead of clay, the spacer fluids may have improved compatibility with displaced fluids, such as oil-based drilling fluids. In addition, the combination of the biopolymer polysaccharide gum and modified cellulose impart unique rheological characteristics to the spacer fluid as compared to use of either of these materials alone. For example, the biopolymer polysaccharide gum and modified cellulose provide spacer fluids with better control of yield point and plastic viscosity thus promoting ease of mixing and higher shear stresses at increased shear rates. At shear rates commonly used in primary cementing, a biopolymer polysaccharide gum alone has difficulty achieving a shear stress greater than the fluid displaced. The requisite shear stress can be achieved but results in an increased yield point that causes difficulty with mixing on the fly. However, combination of the biopolymer polysaccharide gum with the modified cellulose permits higher shear stresses at increased shear rates with undesirably yield point increase. The biopolymer polysaccharide gum is used in a reduced amount limiting the influence on yield point, and the modified cellulose has a higher contribution to plastic viscosity. By way of further example, embodiments of the spacer fluids with the biopolymer polysaccharide gum and modified cellulose may provide solids suspension at temperatures up to 260° F. (127° C.). The spacer fluids may also include a solid surfactant composite, for example, that should also improve compatibility of the spacer fluid.

The solid scouring material used in the spacer fluids may also be essentially free of crystalline silica (i.e., about 5% or less). By using solids scouring materials that are essentially free of crystalline silica, exposure of personal to crystalline silica may be reduced. In addition to the solid scouring material, biopolymer polysaccharide gum, a modified cellulose and optional solid surfactant, the spacer fluids may further include defoaming agents and weighting agents as desired for a particular application. In addition, citric acid may be added, for example, to prevent gelation when the spacer fluid may be contaminated with cement. Cement contamination may occur, for example, from the bulk plant or during operating due to fluid intermixing.

Embodiments may include preparing a spacer dry blend that includes a spacer additive and one or more of a solid surfactant composite and/or a weighting agent, wherein the spacer additive comprises a biopolymer polysaccharide gum, a modified cellulose, and a solid scouring material. In other embodiments, the spacer additive may be combined directly with water, for example, in a batch mixer, with additional additives, such as weighting agents, surfactants (e.g., solid surfactant composites), and other optional additives. The spacer dry blend may be prepared at any suitable location. By way of example, the spacer dry blend may be prepared at the well site or at a remote location from the well site, such as a cement bulk plant. At the well site, the spacer dry blend may be combined with water, and the resulting spacer fluid may then be pumped into the wellbore. In other embodiments, one or more of spacer fluid components (e.g., surfactants, weighting agents, spacer additive) may be individually combined with the water at the well site to form the spacer fluid.

Embodiments of the spacer fluids may include spacer additive that includes a solid scouring material, for example, to scrub and facilitate removal of solid filter cake on wellbore surfaces. In some embodiments, suitable solid scouring materials may have a Mobs hardness of about 5 of greater. In some embodiments, suitable solid scouring materials may have a high angularity such that the solid scouring material has sharp and/or jagged corners. By having sharp and/or jagged corners, the solid scouring material may have improved scouring with higher impact pressures. Angularity and roundness are both terms that can be used to describe the shape of the corners on a particle. The higher the angularity of a particle (e.g., angular particle), the lower the roundness of that particle. Similarly, the higher the roundness of a particle, the lower the angularity of that particle. As will be appreciated by one of skill in the art, and with the help of this disclosure, examples of suitable solid scouring materials may have high angularity. In some embodiments, suitable solid scouring materials may have roundness of less than about 0.6 and a sphericity less than about 0.6. Roundness generally refers to the sharpness of the corners and edges of a grain/particle and it may be defined as the ratio of the average radius of curvature of the corners to the radius of the largest inscribed circle. Since can be quite time consuming to measure roundness, the common method of estimating roundness is to visually compare grains of unknown roundness with standard images of grains of known roundness. Sphericity generally measures the degree to which a particle approaches a spherical shape, and it may be defined as the ratio between the diameter of a sphere with the same volume as the particle and the diameter of the circumscribed sphere. The sphericity of a particle is usually determined by measuring the three linear dimensions of the particle: longest diameter, intermediate diameter and shortest diameter.

In addition, the solid scouring material may be considered essentially free of crystalline silica, in that the solid scouring material may contain reduced amounts of crystalline silica (i.e., about 5% by weight or less). For example, the solid scouring material may contain crystalline silica in an amount about 5%, about 0.5.%, about 0.1%, or less by weight of the solid scouring material. In some embodiments, the solid scouring material may be free of crystalline silica. Because the solid scouring material may be essentially free of crystalline silica, the resultant spacer additive, spacer dry blend, and spacer fluid may also be essentially free of crystalline silica in that they may each contain crystalline silica in an amount about 5%, about 0.5.%, about 0.1%, or less by weight.

Examples of suitable solid scouring materials may include, but are not limited to, pumice, perlite, other volcanic glasses, fumed silica, silica fume, and fly ash, among others. In embodiments, the solid scouring material may have a specific gravity of about 2.5 or less. In some embodiments, the solid scouring material may include perlite. Generally, perlite is a volcanic rock that can exhibit cementitious properties in that it may set and harden in the presence of hydrated lime and water. The perlite may also be ground. Generally, the perlite may have any particle size distribution as desired for a particular application. In certain embodiments, the pumice may have a mean particle size of about 1 micron to about 200 microns as defined by ASTM methods. The mean particle size corresponds to d50 values as measured by particle size analyzers such as those manufactured by Malvern Instruments, Worcestershire, United Kingdom. In specific embodiments, the perlite may have a mean particle size of from about 1 micron to about 200 microns, from about 5 microns to about 100 microns, or from about 10 microns to about 25 microns. The solid scouring material may be present in the spacer additive in any suitable amount, including, but not limited to, an amount of about 91% to about 97.9% by weight of the spacer additive. In specific embodiments, the solid scouring material may be present in an amount of about 91% to about 97%, about 91% to about 96%, about 91% to about 94%, about 93% to about 96%, or from about 93% to about 97.9% by weight of the spacer additive. In a specific example, the solid scouring material may be present in the spacer additive in an amount of about 94.6% by weight of the spacer additive. One of ordinary skill in the art, with the benefit of this disclosure, should be able to select an appropriate particle size and concentration for the solid scouring material.

Embodiments of the spacer fluids may include a spacer additive that includes a biopolymer polysaccharide gum. Examples of suitable biopolymer polysaccharide gums may include, but are not limited to, xanthan gum, diutan gum, welan gum, scleroglucan gum, and combinations thereof. The biopolymer polysaccharide gum may be present in the spacer additive in any suitable amount, including, but not limited to, an amount of about 2% to about 6% by weight of the spacer additive. In specific embodiments, the biopolymer polysaccharide gum may be present in an amount of about 2% to about 5% or from about 2% to about 4%, or from about 4% to about 6%, or from about 5% to about 6% by weight of the spacer additive. In a specific example, the biopolymer polysaccharide gum may be present in the spacer additive in an amount of about 3% by weight of the spacer additive. One of ordinary skill in the art, with the benefit of this disclosure, should be able to select an appropriate concentration for the biopolymer polysaccharide gum.

Embodiments of the spacer fluids may include a spacer additive that includes a modified cellulose. As used herein, a modified cellulose is a cellulose that has undergone chemical modification to the hydroxyl groups of its backbone. Examples of suitable modified cellulose may include, but are not limited to, hydroxyethyl cellulose (HEC), carboxymethyl cellulose (CMC), carboxymethyl hydroxyethyl cellulose (CMHEC), hydroxypropyl methylcellulose (HPMC), polyanionic cellulose (PAC) and combinations thereof. The modified cellulose may be present in the spacer additive in any suitable amount, including, but not limited to, an amount of about 0.1% to about 3% by weight of the spacer additive. In specific embodiments, the modified cellulose may be present in an amount of about 0.1% to about 2% or from about 0.1% to about 1%, or from about 1% to about 3%, or from about 2% to about 3% by weight of the spacer additive. In a specific example, the modified cellulose may be present in the spacer additive in an amount of about 2.4% by weight of the spacer additive. One of ordinary skill in the art, with the benefit of this disclosure, should be able to select an appropriate concentration for the modified cellulose.

The concentrations of the biopolymer polysaccharide gum and the modified cellulose as desired to obtain a spacer fluid with the desired properties. For example, reducing the weight percent of the biopolymer polysaccharide gum and the modified cellulose in the spacer additive should reduce the shear stress produced by the spacer fluid at a given shear rate per unit mass of spacer additive in the spacer dry blend. At low amounts such as 0.1% by weight of the biopolymer polysaccharide gum and the modified cellulose in the spacer additive achieving needed rheology in higher density spacer fluids may be hindered. If weight percent of the biopolymer polysaccharide gum and the modified cellulose in the spacer additive is increased to an elevated amount such as 10% by weight or higher, the amount of solid scouring material may be reduced to such an extent that it becomes ineffective at scrubbing mud filter cake from the wellbore. In some embodiments, the polysaccharide concentration of the biopolymer polysaccharide gum and the cellulose concentration of the modified cellulose may be selected to result in a target yield point for the spacer fluid. The target yield point may be identified for the spacer fluid that sufficiently suspends solid particulates in the spacer fluid for the duration of the pumping operation under subterranean conditions. For example, the target yield point may range from about 2 lbf/100 ft² to about 50 lbf/100 ft². As used herein, the yield point is determined in accordance with API Recommended Practice 10B-2, Second Edition, April 2013.

In some embodiments, the spacer additive may have a biopolymer polysaccharide gum to modified cellulose weight ratio of 60:1 to about 1:2. For example, the spacer additive may have a biopolymer polysaccharide gum to modified cellulose weight ratio of 30:1 to about 1:1, or about 10:1 to about 1:1, or about 5:1 to about 1:1, or about 2:1 to about 1:1, or about 60:1 to about 1:1 or about 60:1 to about 2:1, or about 30:1 to about 1:2, or about 10:1 to about 1:2, or about 5:1 to about 1:2.

The spacer additive may be included in the spacer dry blend in any suitable amount. In some embodiments, the spacer additive including the solid scouring material, biopolymer polysaccharide gum, and the modified cellulose may be included in the spacer dry blend in an amount of about 20% to about 100% by weight of the spacer dry blend. In specific embodiments, the spacer additive may be present in an amount of about 20% to about 50%, about 60% to about 99%, about 80% to about 99%, or about 90% to about 100% by weight of the spacer dry blend. In some embodiments, the spacer dry blend may include only the spacer additive, such that the spacer additive is 100% by weight of the spacer dry blend.

Embodiments of the spacer fluids may include a solid surfactant composite, which may include a surfactant and a solid carrier. In some embodiments, the surfactant on the solid carrier may include a wetting surfactant, a dispersant, and/or a defoaming agent. The solid surfactant composite may have a wide variety of shapes and sizes of individual particles suitable for use in well applications. By way of example, individual particles of the solid surfactant composite may have well-defined physical as well as irregular geometries, including the physical shape of platelets, shavings, fibers, flakes, ribbons, rods, strips, spheroids, hollow beads, toroids, pellets, tablets, or any other physical shape. Without limitation, the solid surfactant composite may have a mean particle size in the range of about 5 microns to about 1,500 microns and, alternatively, a mean particle size in the range of about 20 microns to about 500 microns. However, particle sizes outside these defined ranges also may be suitable for particular applications.

The solid surfactant composite may be included in the spacer dry blend in any suitable amount. In some embodiments, the solid surfactant composite may be included in the spacer dry blend in an amount of about 0.1% to about 10% by weight of the spacer dry blend. In specific embodiments, the spacer dry blend may be present in an amount of about 1% to about 10%, about 1% to about 5%, or about 2% to about 5% by weight of the spacer dry blend.

Any of a variety of surfactants may be included in the solid surfactant composite that may be capable of wetting well surfaces (e.g., water- or oil-wetting), such as the wellbore wall and casing surface. The function that a particular surfactant may perform depends on a variety of factors. These factors may include, but are not limited to, the choice of the hydrophobic and hydrophilic portions and the relative amounts thereof and the presence of any cationic, ionic, non-ionic, amphoteric, or Zwitterionic groups. In some embodiments, both a water-wetting surfactant and an oil-wetting surfactant may be included in the solid surfactant composite. The wetting surfactant may be included in the solid surfactant composite in an amount, without limitation, of from about 5% to about 99.9% based on a total weight of the solid surfactant composite. By way of example, the wetting surfactant may be included in an amount of from about 5%, about 10%, about 20%, about 30%, about 40%, about 50%, about 60%, about 70%, about 80%, about 90%, or about 99.9% by weight the solid surfactant composite. Examples of suitable wetting surfactants may include alcohol ethoxylates, alcohol ethoxysulfates, alkyl phenol ethoxylates (e.g., nonyl phenol ethoxylates), glycol ethers, and combinations thereof. Certain of the wetting surfactants may be used as water-soluble salts. For example, the wetting surfactants may be selected from alkali metal, alkaline earth metal, ammonium, and alkanolammonium salts of alcohol ethoxylates, alcohol ethoxysulfates, and alkyl phenol ethoxylates. One of ordinary skill in the art, with the benefit of this disclosure, should be able to select an appropriate wetting surfactant and concentration thereof for a particular application.

As previously described, the wetting surfactant may be disposed on a solid carrier. Without limitation, the solid carrier may include any of a variety of solid materials, such as diatomaceous earth, amorphous silica, starch, calcium silicate, and combinations thereof. The solid carrier may be included in the solid surfactant composite in an amount, without limitation, of from about 0.1% to about 95% by weight of the solid surfactant composite. By way of example, the solid carrier may be included in an amount of from about 0.1%, about 10%, about 20%, about 30%, about 40%, about 50%, about 60%, about 70%, about 80%, about 90%, or about 95% by weight of the solid surfactant composite. One of ordinary skill in the art, with the benefit of this disclosure, should be able to select an appropriate solid carrier and concentration thereof for a particular application.

Optionally, the solid surfactant composite may include a dispersant. Without limitation, suitable dispersants may include any of a variety of commonly used cement dispersants, such as sulfonated dispersants; sulfonated polymer dispersants; naphthalene sulfonates; melamine sulfonates; sulfonated melamine formaldehyde condensate; sulfonated naphthalene formaldehyde condensate; sulfonate acetone formaldehyde condensate; ethoxylated polyacrylates; or combinations thereof. One example of a suitable dispersant may include a naphthalene sulfonate condensed with from about 4 moles to about 8 moles and, alternatively, about 6 moles of formaldehyde. The dispersant may be included in the solid surfactant composite in an amount, without limitation, of from about 10% to about 90% by weight of the solid surfactant composite. By way of example, the dispersant may be included in an amount of from about 10%, about 20%, about 30%, about 40%, about 50%, about 60%, about 70%, about 80%, or about 90% by weight of the solid surfactant composite. One of ordinary skill in the art, with the benefit of this disclosure, should be able to select an appropriate dispersant and concentration thereof for a particular application.

Optionally, the solid surfactant composite may include a defoaming agent. The defoaming agent may be include in the solid surfactant composite in addition to, or separate from, the dispersant. Suitable defoaming agents may include compounds used in well operations to prevent a well treatment fluid from foaming during mixing and pumping. Without limitation, suitable defoaming agents may include polyol compositions, siloxanes such as polydimethyl siloxane, acetylenic diols, alcohol ethoxylates, fatty alcohol ethoxylates and combinations thereof. The defoaming agent may be included in the solid surfactant composite in addition to, or separate from, the dispersant. The defoaming agent may be included in the solid surfactant composite in an amount, without limitation, of from about 0.1% to about 20% by weight of the solid surfactant composite. By way of example, the defoaming agent may be included in an amount of from about 0.1%, about 5%, about 10%, about 15%, or about 20% by weight of the solid surfactant composite. One of ordinary skill in the art, with the benefit of this disclosure, should be able to select an appropriate defoaming agent and concentration thereof for a particular application.

The solid surfactant composite may be prepared by any suitable technique. By way of example, the components (e.g., wetting surfactant, solid carrier, dispersant, and/or defoaming agent) may be combined to form a mixture. This mixture may then be dried, such as by spray drying, to form a substantially dry solid product. Other suitable techniques for preparation of the solid surfactant composite may also be used as should be apparent to one of ordinary skill in the art.

A wide variety of additional additives may be included in the spacer fluid as deemed appropriate by one skilled in the art, with the benefit of this disclosure. Examples of such additives include but are not limited to: weighting agents (e.g., barite), defoaming agents. Weighting agents may be included in the spacer dry blend, for example, to provide the spacer fluid with a desired density. Examples of suitable weighting agents include, for example, materials having a specific gravity of 2.5 or greater, such as barite, manganese tetraoxide, iron oxide, calcium carbonate, ilmenite or iron carbonate. Weighting agents may be included in any suitable amount, including, but not limited to, from about 0% to about 80% by weight of the spacer fluid. Defoaming agents may be included in the spacer fluid, for example, to reduce undesirable foaming in the spacer fluid upon mixing and instruction into the wellbore. Examples of suitable defoaming agents may include, but are not limited to, polyol compositions, siloxanes such as polydimethyl siloxane, acetylenic diols, ethoxylated alcohols, propoxylated alcohols, fatty alcohol ethoxylates, internal olefins and combinations thereof. Defoaming agents may be included in any suitable amount, including, but not limited to, from about 0.01% to about 10%, about 0.05% to about 5%, or about 0.05% to about 1% by weight of the spacer fluid. A person having ordinary skill in the art, with the benefit of this disclosure, should readily be able to determine the type and amount of additive useful for a particular application and desired result. While these additives are described as being included in the spacer fluid, it is also contemplated that one or more of these additives may alternatively be included in the spacer dry blend.

As previously described, embodiments of the spacer fluid may further include citric acid. Citric acid may be added, for example, to mitigation gelation from cement contamination. Citric acid may be included in any suitable amount, including, but not limited to, from about 0.01% to about 5%, about 0.05% to about 1%, or about 0.05% to about 0.5% by weight of the spacer fluid.

As previously described, the spacer dry blend may be combined with water to form a spacer fluid, which may then be introduced into the wellbore. The water used in an embodiment of the spacer fluids may include, for example, freshwater, saltwater (e.g., water containing one or more salts dissolved therein), brines, seawater, or any combination thereof. Generally, the water may be from any source, provided that the water does not contain an excess of compounds that may undesirably affect other components in the spacer fluid. The water is included in an amount sufficient to form a pumpable spacer fluid. In some embodiments, the water may be included in the spacer fluids in an amount in the range of from about 15% to about 95% by weight of the spacer fluid. In other embodiments, the water may be included in the spacer fluids in an amount in the range of from about 25% to about 85% or about 50% to about 75% by weight of the spacer fluid. The spacer dry blend may be included in the spacer fluid in any suitable amount, including about 5% to about 50%, about 10% to about 60%, or about 20% to about 50% by weight of the spacer fluid. One of ordinary skill in the art, with the benefit of this disclosure, should recognize the appropriate amount of water and spacer dry blend to include for a chosen application.

In addition, the spacer fluids and/or spacer dry blends may be considered essentially free of crystalline silica, in that the spacer fluids and/or dry spacer fluids may contain reduced amounts of crystalline silica (i.e., about 5% by weight or less). For example, the spacer fluids and/or spacer dry blends may contain crystalline silica in an amount about 2%, about 4.%, about 0.1%, or less by weight of the solid scouring material. In some embodiments, the spacer fluids and/or spacer dry blends may be free of crystalline silica.

In addition, embodiments of the spacer fluids and/or spacer dry blends may be essentially free of clay in that they may contain no clay, or, to the extent that clay may be present, the clay is present in an amount of no more than 1% by weight. In some embodiments, the spacer fluids may contain no clay, or, to the extent that clay may be present, the clay is present in an amount of no more than 1%, 0.5%, 0.1%, or less by weight of the spacer fluid. A number of different clays are commonly included in spacer fluids and/or spacer dry blends, including, but not limited to, montmorillonite clays, attapulgite clays, and sepiolite clays. In contrast to conventional spacers fluids that utilize clay for viscosity, the spacer fluids comprising the spacer additive may use the biopolymer polysaccharide gum and modified cellulose for viscosity. When clays are intercalated, the platelets are stacked in layers with ions between the layers. As the clays exfoliate surfactants and ionic fluids with the mud often interact unpredictably with ionically charged platelets. This can result in gelation as well as lack of appropriate viscous properties. By reducing or potentially even eliminating clay from the spacer fluids, the spacer fluid may have increased compatibility with displaced or adjacent fluids.

The spacer fluids generally should have a density suitable for a particular application as desired by those of ordinary skill in the art, with the benefit of this disclosure. In some embodiments, the spacer fluids may have a density in the range of from about 4 pounds per gallon ("lb/gal") (480 kg/m$^3$) to about 24 lg/gal (2900 kg/m$^3$). In other embodiments, the spacer fluids may have a density in the range of about 4 lb/gal (480 kg/m$^3$) to about 17 lb/gal (2040 kg/m$^3$). In yet other embodiments, the spacer fluids may have a density in the range of about 8 lg/gal (960 kg/m$^3$) to about 13 lb/gal (1600 kg/m$^3$). Embodiments of the spacer fluids may be foamed or unfoamed or include other means to reduce their densities known in the art, such as lightweight additives. Those of ordinary skill in the art, with the benefit of this disclosure, will recognize the appropriate density for a particular application.

Suitable spacer fluids may be prepared in accordance with any suitable technique. Without limitation, the desired quantity of water may be introduced into a mixer (e.g., a cement blender) followed by the spacer dry blend. Additional liquid additives and/or dry additives, if any, may be added to the water as desired prior to, or after, combination with the dry blend. This mixture may be agitated for a sufficient period of time to form a pumpable slurry. By way of example, pumps may be used for delivery of this pumpable slurry into the wellbore. As will be appreciated, the spacer fluid and/or the spacer dry blend may be prepared at the well site or prepared offsite and then transported to the well site. If prepared offsite, the spacer dry blend and/or spacer fluid may be transported to the well site using any suitable mode of transportation, including, without limitation, a truck, railcar, barge, or the like. Alternatively, the spacer fluid and/or spacer dry blend may be formulated at the well site, for example, where the components of the spacer fluid and/or spacer dry blend may be delivered from a transport (e.g., a vehicle or pipeline) and then mixed prior to placement downhole. As will be appreciated by those of ordinary skill in the art, with the benefit of this disclosure, other suitable techniques for preparing the spacer fluids may be used in accordance with embodiments.

With limitation, the spacer fluid (as described herein) may be used for displacing a first fluid from a wellbore, the wellbore penetrating a subterranean formation. The method may further include introducing the spacer fluid into the wellbore to displace at least a portion of the first fluid from the wellbore. Without limitation, the spacer fluid may displace the first fluid from a wellbore annulus, such as the annulus between a pipe string and the subterranean formation or between the pipe string and a larger conduit. Non-limiting examples of the first fluid displaced by the spacer fluid may include a drilling fluid. By way of example, the spacer fluid may be used to displace the drilling fluid from the wellbore. In addition to displacement of the drilling fluid from the wellbore, the spacer fluid may also remove the drilling fluid from the walls of the wellbore and/or piper string. Additional steps in the method may include, without limitation, introducing a pipe string into the wellbore, introducing a cement composition into the wellbore with the spacer fluid separating the cement composition and the first fluid. In some embodiments, the spacer fluid is not cementitious in that it generally should not set to form a hardened mass if left in quiescent storage at room temperature for a period of up to 14 days.

As described herein, the spacer fluid may prevent the cement composition from contacting the first fluid, such as a drilling fluid. The spacer fluid may also remove the drilling fluid, dehydrated/gelled drilling fluid, and/or filter cake solids from the wellbore in advance of the cement composition. Removal of these compositions from the wellbore may enhance bonding of the cement composition to surfaces in the wellbore.

The displaced drilling fluid may include, for example, any number of fluids, such as solid suspensions, mixtures, and emulsions. A non-limiting example of a suitable drilling fluid may include an oil-based drilling fluid. An example of a suitable oil-based drilling fluid includes an invert emulsion. Without limitation, the oil-based drilling fluid may include an oleaginous fluid. Examples of suitable oleaginous fluids that may be included in the oil-based drilling fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, dialkylcarbonates, hydrocarbons, and combinations thereof.

The cement composition introduced into the wellbore may include hydraulic cement and water. A variety of hydraulic cements may be utilized in accordance with the present embodiments, including, but not limited to, those including calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may include a Portland cement. In some embodiments, the Portland cements may include cements classified as Classes A, C, H, G, K or L cements according to American Petroleum Institute, *Specification for Cements and Materials for Well Cementing*, API Specification 10A, Twenty Fifth Ed., Mar. 1, 2019. In addition, in some embodiments, the hydraulic cement may include cements classified as ASTM Type I, II, or III.

Without limitation, methods of using the spacer fluids described herein in well cementing will now be described in more detail with reference to FIGS. 1-3. Any of the embodiments of a spacer fluid described herein may apply in the context of FIGS. 1-3. FIG. 1 illustrates an example system 100 that may be used for preparation and delivery of a spacer fluid downhole. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure. As illustrated on FIG. 1, the system 100 may include a vessel 105 and a pump 110. The pump 110 may be positioned downstream of the vessel 105 and may be fluidly coupled to a tubular 115 that is in fluid communication with the wellbore 120. The tubular 115 may be configured to circulate or otherwise deliver the spacer fluid to the wellbore 120. The tubular 115 may be comprised, for example, of one or more different pipes that extend into the wellbore 120. The pump 110 may be, for example, one or more high pressure or low-pressure pumps, which may be depend on, without limitation, the viscosity and density of the spacer fluid. Without limitation, the pump 110 may draw the spacer fluid from the vessel 105, elevate the spacer fluid to an appropriate pressure, and then introduce the spacer fluid to the tubular 115 for delivery downhole. Without limitation, the vessel 105 and pump 110 may be disposed on one or more cement trucks, for example. While not illustrated, system 100 may further include a recirculating mixer, a batch mixer and/or a jet mixer, which may be used for example, in preparation and/or storage of the spacer fluid. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 2:
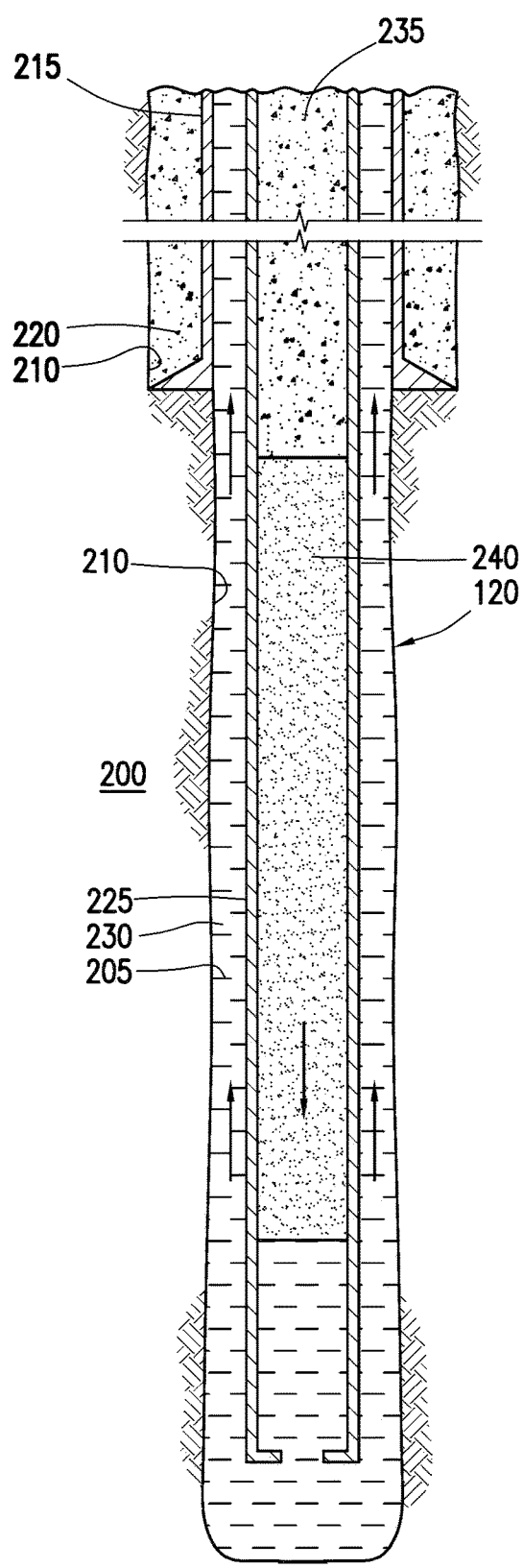
FIG. 2 is a schematic illustration of an example in which a spacer fluid is used between a cement composition and a drilling fluid.

FIG. 2 depicts one or more subterranean formations 200 penetrated by wellbore 120 with drilling fluid 205 disposed therein. The drilling fluid 205 may include the example drilling fluids disclosed herein as well as other suitable drilling fluids that will be readily apparent to those of ordinary skill in the art. While the wellbore 120 is shown extending generally vertically into the one or more subterranean formations 200, the principles described herein are also applicable to wellbores that extend at an angle through the one or more subterranean formations 200, such as horizontal and slanted wellbores. As illustrated, the wellbore 120 includes walls 210. Without limitation, a surface casing 215 may be cemented to the walls 210 of the wellbore 120 by cement sheath 220. Without limitation, one or more additional pipe strings (e.g., intermediate casing, production casing, liners, etc.), shown here as casing 225 may also be disposed in the wellbore 120. As illustrated, there is a wellbore annulus 230 formed between the casing 225 and the walls 210 of the wellbore 120 (and/or a larger conduit such as the surface casing 215). While not shown, one or more centralizers may be attached to the casing 225, for example, to centralize the casing 225 in the wellbore 120 prior to and during the cementing operation.

As illustrated, a cement composition 235 may be introduced into the wellbore 120. For example, the cement composition 235 may be pumped down the interior of the casing 225. A pump (e.g., pump 110 on FIG. 1) may be used for delivery of the cement composition 235 into the wellbore 120. It may be desired to circulate the cement composition 235 in the wellbore 120 until it is in the wellbore annulus 230. The cement composition 235 may include the example cement compositions disclosed herein as well as other suitable cement compositions that will be readily apparent to those of ordinary skill in the art. While not illustrated, other techniques may also be utilized for introduction of the cement composition 235. By way of example, reverse circulation techniques may be used that include introducing the cement composition 235 into the wellbore 120 by way of the wellbore annulus 230 instead of through the casing 225.

Without limitation, the spacer fluid 240 may be used to separate the drilling fluid 205 from the cement composition 235. The previous description with reference to FIG. 1 for preparation of a spacer fluid may be used for delivery of the spacer fluid 240 into the wellbore 120. Moreover, a pump (e.g., pump 110 on FIG. 1) may also be used for delivery of the spacer fluid 240 into the wellbore 120. The spacer fluid 240 may be used with the cement composition 235 for displacement of the drilling fluid 205 from the wellbore 120 as well as preparing the wellbore 120 for the cement composition 235. By way of example, the spacer fluid 240 may function, inter alia, to remove the drilling fluid 205, drilling fluid 205 that is dehydrated/gelled, and/or filter cake solids from the wellbore 120 in advance of the cement composition 235. While not shown, one or more plugs or other suitable devices may be used to physically separate the drilling fluid 205 from the spacer fluid 240 and/or the spacer fluid 240 from the cement composition 235.

Figure 3:
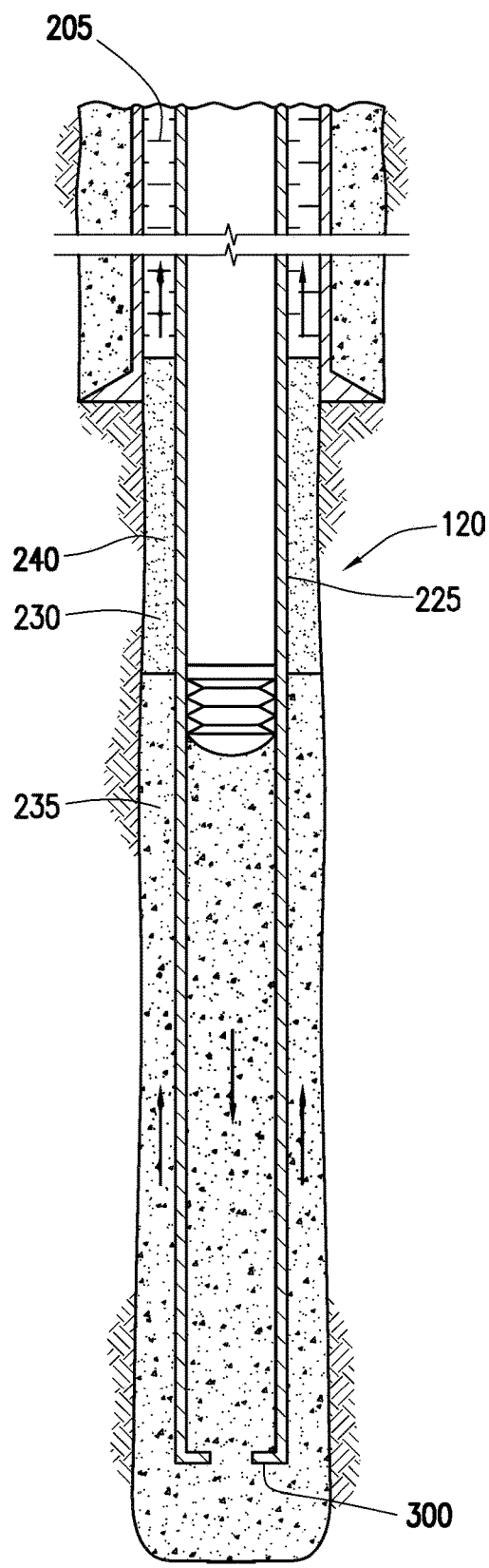
FIG. 3 is a schematic illustration of the embodiment of FIG. 2 showing displacement of the drilling fluid.

Referring now to FIG. 3, the drilling fluid 205 has been displaced from the wellbore annulus 230. As illustrated, the spacer fluid 240 and the cement composition 235 may be allowed to flow down the interior of the casing 225 through the bottom of the casing 225 (e.g., casing shoe 300) and up around the casing 225 into the wellbore annulus 230, thus displacing the drilling fluid 205. At least a portion of the displaced drilling fluid 205 may exit the wellbore annulus 230 via a flow line 125 and be deposited, for example, in one or more retention pits 130 (e.g., a mud pit), as shown in FIG. 1. Turning back to FIG. 3, the cement composition 235 may continue to be circulated until it has reached a desired location in the wellbore annulus 230. The spacer fluid 240 (or a portion thereof) and/or the cement composition 235 may be left in the wellbore annulus 230. As illustrated, the spacer fluid 240 may be disposed in the wellbore annulus 230 above or on top of the cement composition 235. The cement composition 235 may set in the wellbore annulus 230 to form an annular sheath of hardened, substantially impermeable material (i.e., a cement sheath) that may support and position the casing 225 in the wellbore 120.

Accordingly, this disclosure describes spacer fluids t that include a spacer additive comprising a biopolymer polysaccharide gum, a modified cellulose, and a solid scouring material while being essentially free of clay and crystalline silica. The systems and methods may further be characterized by one or more of the following statements:

Statement 1. A method for displacing wellbore fluids, comprising: providing a spacer fluid comprising water and a spacer additive, wherein the spacer fluid has a yield point of about 2 lbf/100 ft$^2$ to about 50 lbf/100 ft$^2$, wherein the spacer additive comprises a biopolymer polysaccharide gum, a modified cellulose, and a solid scouring material, wherein the spacer additive is essentially free of crystalline silica; wherein the spacer additive is essentially free of clay; wherein the biopolymer polysaccharide gum is present in the spacer additive in an amount of about 2% to about 6% by weight of the spacer additive; wherein the modified cellulose is present in the spacer additive in an amount of about 0.1% to about 3% by weight of the spacer additive; and wherein the solid scouring material is present in the spacer additive in an amount of about 91% to about 97.9% by weight of the spacer additive; and introducing the spacer fluid into a wellbore to displace at least a portion of a first fluid in the wellbore.

Statement 2. The method of Statement 1, further comprising combining the spacer additive with at least water to form the spacer fluid.

Statement 3. The method of Statement 2, further comprising combining the spacer additive with one or more additional solid additives to form a spacer dry blend, wherein the combining the spacer additive with at least water to form a spacer fluid comprises combining the spacer dry blend comprising the spacer additive with at least water.

Statement 4. The method of Statement 3, wherein the one or more additional solid additives comprise at least one solid selected from the group consisting of a solid surfactant composite, a weighting agent, any combination thereof.

Statement 5. The method of Statement 3, wherein the one or more additional solid additives comprises a solid surfactant composite comprising a wetting surfactant.

Statement 6. The method of any one of Statements 2-5, wherein the spacer additive is included in the spacer dry blend in an amount of about 20% to about 50% by weight of the spacer dry blend.

Statement 7. The method of any preceding claim, wherein the solid scouring material comprises at least one material selected from the group consisting of pumice, perlite, another volcanic glass, fumed silica, silica fume, fly ash, and any combination thereof, and wherein the biopolymer polysaccharide gum comprises at least one gum selected from the group consisting of xanthan gum, diutan gum, welan gum, sclerogucan gum, any combination thereof, and wherein the modified cellulose comprises at least one cellulose selected from the group consisting of hydroxyethyl cellulose, carboxymethyl cellulose, carboxymethyl hydroxyethyl cellulose, hydroxypropyl methylcellulose, polyanionic cellulose, and any combination thereof.

Statement 8. The method of any preceding claim, wherein the spacer additive has a biopolymer polysaccharide gum to modified cellulose weight ratio of about 5:1 to about 1:2.

Statement 9. The method of any preceding claim, wherein the spacer fluid further comprises citric acid.

Statement 10. The method of any preceding claim, wherein the spacer fluid comprises the water in an amount of about 15% to about 95% by weight of the spacer fluid.

Statement 11. The method of any preceding claim, wherein the spacer fluid is not cementitious in that the spacer fluid does not set to form a hardened mass if left in a quiescent state at room temperature for a period of up to 14 days.

Statement 12. The method of any preceding claim, wherein the spacer fluid further comprises barite and citric acid, wherein the biopolymer polysaccharide gum comprises diutan gum, wherein the solid scouring material comprises perlite, and wherein the modified cellulose comprises hydroxyethyl cellulose.

Statement 13. The method of Statement 12, wherein citric acid is present in the spacer fluid in an amount of about 0.05% to about 0.5% by weight of the spacer fluid, wherein the diutan gum is present in the spacer additive in an amount of about 2% to about 4% by weight of the spacer additive, wherein the hydroxyethyl cellulose is present in the spacer additive in an amount of about 2% to about 3% by weight of the spacer additive, wherein the perlite is present in the spacer additive in an amount of about 93% to about 96% by weight of the spacer additive, wherein the method further comprises combining the spacer additive with one or more solid additives to form a spacer dry blend, and wherein the combining the spacer additive with at least water to form a spacer fluid comprising combing the spacer dry blend comprising the spacer additive with at least water.

Statement 14. The method of claim 13, wherein the one or more additional solid additives comprises barite.

Statement 15. A method for preparing a spacer fluid comprising: identifying a target yield point for the spacer fluid; determining a polysaccharide concentration of a biopolymer polysaccharide gum and a cellulose concentration of a modified cellulose that results in the target yield point for the spacer fluid; preparing a spacer additive comprising the biopolymer polysaccharide gum, the modified cellulose, and a solid scouring material; wherein the spacer additive is essentially free of crystalline silica; wherein the spacer additive is essentially free of clay; wherein the biopolymer polysaccharide gum is present in the polysaccharide concentration; wherein the modified cellulose is present in the cellulose concentration; and wherein the solid scouring material is present in the spacer additive in an amount of about 91% to about 96.9% by weight of the spacer additive; and combining the spacer additive with at least water to form the spacer fluid.

Statement 16. The method of Statement 15, further comprising combining the spacer additive with one or more additional solid additives to form a spacer dry blend, wherein the combining the spacer additive with at least water to form a spacer fluid comprises combining the spacer dry blend comprising the spacer additive with at least water.

Statement 17. The method of Statement 16, wherein the one or more additional solid additives comprise at least one solid selected from the group consisting of a solid surfactant composite, a weighting agent, any combination thereof.

Statement 18. The method of any one of Statements 15-17, wherein the spacer additive has a biopolymer polysaccharide gum to modified cellulose weight ratio of about 5:1 to about 1:2.

Statement 19. The method of any one of Statements 15-18, wherein the spacer fluid further comprises barite and citric acid, wherein the biopolymer polysaccharide gum comprises diutan gum, wherein the solid scouring material comprises perlite, and wherein the modified cellulose comprises hydroxyethyl cellulose.

Statement 20. The method of any one of Statements 15-19, wherein the target yield point ranges from about 2 lbf/100 ft$^2$ to about 50 lbf/100 ft$^2$.

To facilitate a better understanding of the present disclosure, the following examples of certain aspects of some embodiments are given. In no way should the following examples be read to limit, or define, the scope of the disclosure. In the following examples, concentrations are given in weight percent of the overall composition.

Example 1

Three sample spacer fluids were prepared and evaluated for fluid compatibility with a Water-base mud (WBM). The spacer fluids each included barite in an amount sufficient to provide a density of 9.4 lbm/gal (1126 kg/m$^3$). Spacer 1 was a comparative fluid that included water, a clay-based viscosifier, a biopolymer viscosifier, a dispersant, and barite. Spacer 2 was a comparative sample that included water, barite, and a spacer additive in an amount of 20 pounds per barrel (42 gallons) of the spacer fluid. The spacer additive included in Spacer 2 was perlite in an amount of 94.6% by weight and diutan gum in an amount of 5.4% by weight. Spacer 3 included water, barite, and a spacer additive in an amount of 20 pounds per barrel of the spacer fluid. The spacer additive for Spacer 3 included perlite in an amount of 94.6% by weight, diutan gum in an amount of 3% by weight, and hydroxyethyl cellulose in an amount of 2.4% by weight. The WBM was a water-based drilling mud having a density of 8.8 lbm/gal (1126 kg/m$^3$).

The three sample spacer fluids were evaluated for fluid compatibility with WBM at 120° F. (49° C.). The spacer fluid and WBM were conditioned at the test temperature for 30 minutes prior to measurement. Ratios prescribed in API Recommend Practices 10B2 (2013) were prepared, and rheological measurements were taken on each spacer fluid, OBM, and their mixtures using an FANN® 35 viscometer having an R1-B1-F1 configuration. Dial readings from the viscometer for the fluids are shown at rotational speeds in Tables 1 to 3. Rotational speeds of 60 rotations per minute (rpm) and 100 rpm are of key interest as they most closely approach shear rates commonly experienced during primary cementing. At 60 rpm and 100 rpm, the mixtures of Spacer 3 showed superior performance to those of Spacer 1 and 2 with dial readings generally more compatible than the other samples, especially at a 50:50 spacer to WBM ratio, indicating good fluid rheological compatibility for Spacer 3 and WBM.

TABLE 1

Rheological Compatibility of Spacer 1 (comparative) and WBM at 120° F.

| Ratio of WBM to Spacer 1 | 300 rpm | 200 rpm | 100 rpm | 60 rpm | 30 rpm | 6 rpm | 3 rpm |
|---|---|---|---|---|---|---|---|
| 100:0 | 29 | 26 | 22 | 21 | 19 | 17 | 15 |
| 95:5 | 33 | 29 | 25 | 23 | 21 | 17 | 15 |
| 75:25 | 44 | 38 | 32 | 28 | 25 | 17 | 14 |
| 50:50 | 41 | 35 | 30 | 26 | 23 | 15 | 13 |
| 25:75 | 37 | 32 | 27 | 24 | 21 | 14 | 12 |
| 5:95 | 34 | 29 | 25 | 22 | 18 | 13 | 12 |
| 0:100 | 31 | 27 | 23 | 20 | 16 | 12 | 11 |

TABLE 2

Rheological Compatibility of Spacer 2 (comparative) and WBM at 120° F.

| Ratio of WBM to Spacer 2 | 300 rpm | 200 rpm | 100 rpm | 60 rpm | 30 rpm | 6 rpm | 3 rpm |
|---|---|---|---|---|---|---|---|
| 100:0 | 29 | 26 | 23 | 21 | 19 | 17 | 15 |
| 95:75 | 32 | 28 | 25 | 22 | 20 | 16 | 13 |
| 75:25 | 40 | 34 | 29 | 26 | 22 | 14 | 11 |
| 50:50 | 35 | 30 | 27 | 24 | 21 | 15 | 13 |
| 25:75 | 29 | 26 | 24 | 22 | 19 | 16 | 14 |
| 5:95 | 31 | 27 | 25 | 24 | 22 | 17 | 15 |
| 0:100 | 25 | 24 | 23 | 22 | 21 | 18 | 17 |

TABLE 3

Rheological Compatibility of Spacer 3 and WBM at 120° F.

| Ratio of WBM to Spacer 3 | 300 rpm | 200 rpm | 100 rpm | 60 rpm | 30 rpm | 6 rpm | 3 rpm |
|---|---|---|---|---|---|---|---|
| 100:0 | 29 | 26 | 23 | 21 | 19 | 17 | 15 |
| 95:75 | 28 | 25 | 22 | 19 | 20 | 16 | 14 |
| 75:25 | 26 | 23 | 20 | 18 | 16 | 14 | 13 |
| 50:50 | 29 | 25 | 21 | 19 | 17 | 14 | 13 |
| 25:75 | 32 | 27 | 22 | 20 | 18 | 14 | 12 |
| 5:95 | 27 | 23 | 19 | 17 | 15 | 12 | 10 |
| 0:100 | 25 | 21 | 17 | 15 | 13 | 11 | 9 |

The plastic viscosity and yield point for each of the WBM, Spacer 1, Spacer 2, and Spacer 3 were calculated with the values provided in Table 4 below. The plastic viscosity and yield point were calculated in accordance with API Recommend Practices 10B2 (2013).

TABLE 4

Plastic Viscosity and Yield Point at 120° F.

| rpm | WBM | Spacer 1 | Spacer 2 | Spacer 3 |
|---|---|---|---|---|
| 300 | 29 | 31 | 25 | 25 |
| 200 | 26 | 27 | 24 | 21 |
| 100 | 22 | 23 | 23 | 17 |
| 60 | 21 | 20 | 22 | 15 |
| 30 | 19 | 16 | 21 | 13 |
| 6 | 17 | 12 | 18 | 11 |
| 3 | 15 | 11 | 17 | 9 |
| PV, cP | 13 | 19 | 7 | 15 |
| YP, lbf/100 ft² | 18 | 14 | 20 | 12 |

Example 2

Spacers 1 to 3 from Example 1 were further evaluated for fluid compatibility with an oil-based mud (OBM). The spacer fluids each included barite in an amount sufficient to provide a density of 12.7 lbm/gal (1522 kg/m³). The OBM was a diesel-based invert emulsion drilling mud having a density of 10 lbm/gal (1201 kg/m³).

The three sample spacer fluids were evaluated for fluid compatibility with OBM at 150° F. (66° C.). The spacer fluid and OBM were conditioned at the test temperature for 30 minutes prior to measurement. Ratios prescribed in API Recommended Practices 10B2 (2013) were prepared, and rheological measurements were taken on each spacer fluid, OBM, and their mixtures using an FANN 35 viscometer having an R1-B5-F1 configuration. Dial readings from the viscometer for the fluids are shown at rotational speeds in Tables 5 to 8. Rotational speeds of 60 rotations per minute (rpm) and 100 rpm are of key interest as they most closely approach shear rates commonly experienced during primary cementing. The results obtained in this example revealed the YP of spacer 3 is optimized when compared to the other spacer system. And when it comes to compatibilities the mixtures of Spacer 3 comparable performance to those of Spacer 1 and 2, although compatibilities results are not ideal readings the trend obtained from each spacer indicates that there is room to optimize concentrations of blends

TABLE 5

Rheological Compatibility of Spacer 1 (comparative) and OBM at 150° F.

| Ratio of OBM to Spacer 1 | 300 rpm | 200 rpm | 100 rpm | 60 rpm | 30 rpm | 6 rpm | 3 rpm |
|---|---|---|---|---|---|---|---|
| 100:0 | 50 | 42 | 30 | 25 | 20 | 14 | 12 |
| 95:5 | 58 | 46 | 33 | 26 | 22 | 14 | 13 |
| 75:25 | 70 | 55 | 38 | 30 | 23 | 15 | 13 |
| 50:50 | 92 | 74 | 52 | 41 | 31 | 18 | 15 |
| 25:75 | 74 | 63 | 48 | 40 | 34 | 21 | 18 |
| 5:95 | 56 | 48 | 42 | 30 | 26 | 15 | 12 |
| 0:100 | 50 | 41 | 33 | 28 | 23 | 12 | 11 |

TABLE 6

Rheological Compatibility of Spacer 2 (comparative) and OBM at 150° F.

| Ratio of OBM to Spacer 2 | 300 rpm | 200 rpm | 100 rpm | 60 rpm | 30 rpm | 6 rpm | 3 rpm |
|---|---|---|---|---|---|---|---|
| 100:0 | 50 | 42 | 30 | 25 | 20 | 14 | 12 |
| 95:75 | 55 | 48 | 33 | 27 | 20 | 15 | 13 |
| 75:25 | 66 | 53 | 37 | 29 | 22 | 18 | 14 |
| 50:50 | 90 | 72 | 49 | 35 | 25 | 20 | 16 |
| 25:75 | 53 | 46 | 40 | 36 | 31 | 25 | 23 |
| 5:95 | 46 | 38 | 34 | 32 | 30 | 26 | 24 |
| 0:100 | 40 | 36 | 33 | 31 | 29 | 25 | 23 |

TABLE 7

Rheological Compatibility of Spacer 3 and OBM at 150° F.

| Ratio of OBM to Spacer 3 | 300 rpm | 200 rpm | 100 rpm | 60 rpm | 30 rpm | 6 rpm | 3 rpm |
|---|---|---|---|---|---|---|---|
| 100:0 | 50 | 42 | 30 | 25 | 20 | 14 | 12 |
| 95:75 | 66 | 50 | 35 | 27 | 20 | 14 | 12 |
| 75:25 | 85 | 65 | 43 | 33 | 24 | 13 | 11 |
| 50:50 | 121 | 97 | 68 | 54 | 41 | 25 | 20 |
| 25:75 | 65 | 54 | 40 | 32 | 25 | 16 | 13 |
| 5:95 | 47 | 40 | 32 | 27 | 23 | 15 | 13 |
| 0:100 | 39 | 34 | 28 | 25 | 22 | 12 | 15 |

The plastic viscosity and yield point for each of the OBM, Spacer 1, Spacer 2, and Spacer 3 were calculated with the values provided in Table 8 below. The plastic viscosity and yield point were calculated in accordance with API Recommend Practices 10B2 (2013).

TABLE 8

Plastic Viscosity and Yield Point at 120° F.

| rpm | WBM | Spacer 1 | Spacer 2 | Spacer 3 |
|---|---|---|---|---|
| 300 | 50 | 50 | 40 | 39 |
| 200 | 42 | 41 | 36 | 34 |
| 100 | 30 | 33 | 33 | 28 |
| 60 | 25 | 28 | 31 | 25 |
| 30 | 20 | 23 | 29 | 22 |
| 6 | 14 | 12 | 25 | 12 |
| 3 | 12 | 11 | 23 | 15 |
| PV, cP | 37 | 37 | 15 | 24 |
| YP, lbf/100 ft² | 16 | 17 | 28 | 18 |

Example 3

Spacers 1 to 3 from Example 1 were further evaluated for fluid compatibility with a heavier oil-based mud (OBM). The spacer fluids each included barite in an amount sufficient to provide a density of 17.8 lbm/gal (2133 kg/m$^3$). The OBM was a diesel-based invert emulsion drilling mud having a density of 16 lbm/gal (1921 kg/m$^3$).

The three sample spacer fluids were evaluated for fluid compatibility with OBM at 190° F. (88° C.). The spacer fluid and OBM were conditioned at the test temperature for 30 minutes prior to measurement. Ratios prescribed in API Recommended Practices 10B2 (2013) were prepared, and rheological measurements were taken on each spacer fluid, OBM, and their mixtures using an OFITE 900 automated viscometer having an R1-B1-F1 configuration. Dial readings from the viscometer for the fluids are shown at rotational speeds in Tables 9 to 11. Rotational speeds of 60 rotations per minute (rpm) and 100 rpm are of key interest as they most closely approach shear rates commonly experienced during primary cementing. Yield point for Spacer 3 is comparable to Spacer 1 and enhanced compared to Spacer 2. Compatibilities revealed that Spacer 3 performs better than Spacer 2. The YP obtained for Spacer 3 with concentration of 20 pound per barrel indicates that concentration can be optimized to improve the overall compatibilities results without affecting the rheological hierarchy required

TABLE 9

Rheological Compatibility of Spacer 1 (comparative) and OBM at 190° F.

| Ratio of OBM to Spacer 1 | 300 rpm | 200 rpm | 100 rpm | 60 rpm | 30 rpm | 6 rpm | 3 rpm |
|---|---|---|---|---|---|---|---|
| 100:0 | 60 | 38 | 25 | 20 | 14 | 9 | 6 |
| 95:5 | 90 | 65 | 40 | 31 | 20 | 10 | 6 |
| 75:25 | 115 | 86 | 57 | 44 | 30 | 15 | 10 |
| 50:50 | 200 | 170 | 115 | 90 | 63 | 22 | 16 |
| 25:75 | 110 | 85 | 60 | 45 | 33 | 15 | 10 |
| 5:95 | 75 | 61 | 40 | 32 | 25 | 12 | 10 |
| 0:100 | 64 | 51 | 37 | 31 | 24 | 14 | 11 |

TABLE 10

Rheological Compatibility of Spacer 2 (comparative) and OBM at 190° F.

| Ratio of OBM to Spacer 2 | 300 rpm | 200 rpm | 100 rpm | 60 rpm | 30 rpm | 6 rpm | 3 rpm |
|---|---|---|---|---|---|---|---|
| 100:0 | 60 | 38 | 25 | 20 | 14 | 9 | 6 |
| 95:75 | 84 | 65 | 48 | 37 | 27 | 13 | 11 |
| 75:25 | 137 | 100 | 60 | 44 | 30 | 15 | 12 |
| 50:50 | — | — | 270 | 220 | 174 | 60 | 39 |
| 25:75 | 117 | 97 | 74 | 63 | 53 | 40 | 28 |
| 5:95 | 80 | 75 | 59 | 48 | 45 | 33 | 24 |
| 0:100 | 55 | 47 | 37 | 32 | 27 | 20 | 18 |

TABLE 11

Rheological Compatibility of Spacer 3 and OBM at 190° F.

| Ratio of OBM to Spacer 3 | 300 rpm | 200 rpm | 100 rpm | 60 rpm | 30 rpm | 6 rpm | 3 rpm |
|---|---|---|---|---|---|---|---|
| 100:0 | 60 | 38 | 25 | 20 | 14 | 9 | 6 |
| 95:75 | 82 | 61 | 36 | 26 | 18 | 9 | 7 |
| 75:25 | 122 | 91 | 59 | 44 | 30 | 16 | 13 |
| 50:50 | — | 240 | 147 | 106 | 77 | 38 | 30 |
| 25:75 | 98 | 81 | 60 | 50 | 39 | 24 | 18 |
| 5:95 | 80 | 69 | 51 | 38 | 29 | 20 | 16 |
| 0:100 | 51 | 42 | 31 | 26 | 21 | 15 | 12 |

The plastic viscosity and yield point for each of the OBM, Spacer 1, Spacer 2, and Spacer 3 were calculated with the values provided in Table 12 below. The plastic viscosity and yield point were calculated in accordance with API Recommend Practices 10B2 (2013).

TABLE 8

Plastic Viscosity and Yield Point at 120° F.

| rpm | WBM | Spacer 1 | Spacer 2 | Spacer 3 |
|---|---|---|---|---|
| 300 | 60 | 64 | 55 | 51 |
| 200 | 38 | 51 | 47 | 42 |
| 100 | 25 | 37 | 37 | 31 |
| 60 | 20 | 31 | 32 | 26 |
| 30 | 14 | 24 | 27 | 21 |
| 6 | 9 | 14 | 20 | 15 |
| 3 | 6 | 11 | 18 | 12 |
| PV, cP | 50 | 51 | 36 | 37 |
| YP, lbf/100 ft$^2$ | 8 | 17 | 23 | 17 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for displacing wellbore fluids, comprising:
providing a spacer fluid comprising water and a spacer additive, wherein the spacer fluid has a yield point of about 2 lbf/100 ft$^2$ to about 50 lbf/100 ft$^2$, wherein the spacer additive comprises a biopolymer polysaccharide gum, a modified cellulose, and a solid scouring material,
wherein the spacer additive is essentially free of crystalline silica;
wherein the spacer additive is essentially free of clay;
wherein the biopolymer polysaccharide gum is present in the spacer additive in an amount of about 2% to about 6% by weight of the spacer additive;
wherein the modified cellulose is present in the spacer additive in an amount of about 0.25% to about 3% by weight of the spacer additive; and
wherein the solid scouring material is present in the spacer additive in an amount of about 91% to about 97.9% by weight of the spacer additive; and
introducing the spacer fluid into a wellbore to displace at least a portion of a first fluid in the wellbore.

2. The method of claim 1, further comprising combining the spacer additive with at least water to form the spacer fluid.

3. The method of claim 2, further comprising combining the spacer additive with one or more additional solid additives to form a spacer dry blend, wherein the combining the spacer additive with at least water to form a spacer fluid comprises combining the spacer dry blend comprising the spacer additive with at least water.

4. The method of claim 3, wherein the one or more additional solid additives comprise at least one solid selected from the group consisting of a solid surfactant composite, a weighting agent, any combination thereof.

5. The method of claim 3, wherein the one or more additional solid additives comprises a solid surfactant composite comprising a wetting surfactant.

6. The method of claim 3, wherein the spacer additive is included in the spacer dry blend in an amount of about 20% to about 50% by weight of the spacer dry blend.

7. The method of claim 1, wherein the solid scouring material comprises at least one material selected from the group consisting of pumice, perlite, another volcanic glass, fumed silica, silica fume, fly ash, and any combination thereof, and wherein the biopolymer polysaccharide gum comprises at least one gum selected from the group consisting of xanthan gum, diutan gum, welan gum, sclerogucan gum, any combination thereof, and wherein the modified cellulose comprises at least one cellulose selected from the group consisting of hydroxyethyl cellulose, carboxymethyl cellulose, carboxymethyl hydroxyethyl cellulose, hydroxypropyl methylcellulose, polyanionic cellulose, and any combination thereof.

8. The method of claim 1, wherein the spacer additive has a biopolymer polysaccharide gum to modified cellulose weight ratio of about 5:1 to about 1:2.

9. The method of claim 1, wherein the spacer fluid further comprises citric acid.

10. The method of claim 1, wherein the spacer fluid comprises the water in an amount of about 15% to about 95% by weight of the spacer fluid.

11. The method of claim 1, wherein the spacer fluid is not cementitious in that the spacer fluid does not set to form a hardened mass if left in a quiescent state at room temperature for a period of up to 14 days.

12. The method of claim 1, wherein the spacer fluid further comprises barite and citric acid, wherein the biopolymer polysaccharide gum comprises diutan gum, wherein the solid scouring material comprises perlite, and wherein the modified cellulose comprises hydroxyethyl cellulose.

13. The method of claim 12, wherein citric acid is present in the spacer fluid in an amount of about 0.05% to about 0.5% by weight of the spacer fluid, wherein the diutan gum is present in the spacer additive in an amount of about 2% to about 4% by weight of the spacer additive, wherein the hydroxyethyl cellulose is present in the spacer additive in an amount of about 2% to about 3% by weight of the spacer additive, wherein the perlite is present in the spacer additive in an amount of about 93% to about 96% by weight of the spacer additive, wherein the method further comprises combining the spacer additive with one or more solid additives to form a spacer dry blend, and wherein the combining the spacer additive with at least water to form a spacer fluid comprising combing the spacer dry blend comprising the spacer additive with at least water.

14. The method of claim 13, wherein the one or more additional solid additives comprises barite.

15. A method for displacing wellbore fluids, comprising:
providing a spacer fluid comprising water and a spacer additive, wherein the spacer fluid has a yield point of about 2 lbf/100 ft$^2$ to about 50 lbf/100 ft$^2$, wherein the spacer additive comprises a biopolymer polysaccharide gum, a modified cellulose, and perlite,
wherein the spacer additive is essentially free of crystalline silica;
wherein the spacer additive is essentially free of clay;
wherein the biopolymer polysaccharide gum is present in the spacer additive in an amount of about 2% to about 6% by weight of the spacer additive;
wherein the modified cellulose is present in the spacer additive in an amount of about 0.25% to about 3% by weight of the spacer additive; and
wherein perlite is present in the spacer additive in an amount of about 91% to about 97.9% by weight of the spacer additive; and
introducing the spacer fluid into a wellbore to displace at least a portion of a first fluid in the wellbore.

16. The method of claim 15, wherein the biopolymer polysaccharide gum comprises diutan gum and wherein the modified cellulose comprises hydroxyethyl cellulose.

17. The method of claim 15, wherein the biopolymer polysaccharide gum is diutan gum present in an amount of about 2% to about 5.4% by weight of the spacer additive.

18. The method of claim 15, wherein the modified cellulose is hydroxyethyl cellulose present in an amount of about 2% to 2.4% by weight of the spacer additive.

19. The method of claim 15, wherein perlite is present in the spacer additive in an amount of about 97% to about 97.9% by weight of the spacer additive.

20. The method of claim 15, wherein the biopolymer polysaccharide gum is diutan gum present in an amount of about 2% to about 5.4% by weight of the spacer additive, wherein the modified cellulose is hydroxyethyl cellulose present in an amount of about 0.25% to 2.4% by weight of the spacer additive, and wherein perlite is present in the spacer additive in an amount of about 94.6% to about 97.9% by weight of the spacer additive.

* * * * *